US011652691B1

(12) United States Patent
Ramalingam et al.

(10) Patent No.: US 11,652,691 B1
(45) Date of Patent: May 16, 2023

(54) MACHINE LEARNING-BASED PLAYBACK OPTIMIZATION USING NETWORK-WIDE HEURISTICS

(71) Applicant: Amazon Technologies, Inc., Seattle, WA (US)

(72) Inventors: Satheesh Ramalingam, Sammamish, WA (US); Rahul Urgaonkar, Shoreline, WA (US); Adhvik Arun Shetty, Seattle, WA (US); Moping Dou, Seattle, WA (US); Hargun Kaur, Bangalore (IN); Mohan Padmanabhan, Sammamish, WA (US); Manish Rao, Seattle, WA (US); Amarsingh B. Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/096,922

(22) Filed: Nov. 12, 2020

(51) Int. Cl.
| | |
|---|---|
| *H04L 41/082* | (2022.01) |
| *H04L 41/16* | (2022.01) |
| *H04L 43/0817* | (2022.01) |
| *G06N 20/00* | (2019.01) |
| *G06N 5/00* | (2023.01) |
| *H04L 43/0888* | (2022.01) |
| *H04L 41/0816* | (2022.01) |
| *H04L 41/0893* | (2022.01) |
| *G06N 5/01* | (2023.01) |

(52) U.S. Cl.
CPC .............. *H04L 41/082* (2013.01); *G06N 5/01* (2023.01); *G06N 20/00* (2019.01); *H04L 41/0816* (2013.01); *H04L 41/0893* (2013.01); *H04L 41/16* (2013.01); *H04L 43/0817* (2013.01); *H04L 43/0888* (2013.01)

(58) Field of Classification Search
None
See application file for complete search history.

(56) References Cited

U.S. PATENT DOCUMENTS

| | | | |
|---|---|---|---|
| 8,386,639 | B1 | 2/2013 | Galvin |
| 9,942,085 | B2 * | 4/2018 | Tsagkaris .............. H04W 28/18 |
| 10,559,001 | B1 | 2/2020 | Bradley et al. |
| 10,999,146 | B1 * | 5/2021 | Savalle ................. G06F 16/353 |
| 11,089,092 | B1 * | 8/2021 | Seibel ................... H04L 67/101 |
| 2003/0208390 | A1 | 11/2003 | Posner |
| 2005/0097204 | A1 | 5/2005 | Horowitz |

(Continued)

*Primary Examiner* — Scott B Christensen
(74) *Attorney, Agent, or Firm* — Eversheds Sutherland (US) LLP

(57) ABSTRACT

Systems, methods, and computer-readable media are disclosed for optimizing network performance on a computer device to improve quality of experience by determining which network settings on the computing device to adjust. A clustering algorithm may identify various classes of networks and a classification algorithm may determine a network class specific to a network on a computing device. The effects of certain network settings for that networks class may be determined and the network setting and/or settings that optimizes the network performance may be promoted. The system may periodically analyze network data to recalculate the appropriate networks class and may determine different network settings based on the recalculation, facilitating mid-session improvements to the quality of experience.

14 Claims, 11 Drawing Sheets

(56) References Cited

U.S. PATENT DOCUMENTS

| | | |
|---|---|---|
| 2007/0055554 A1 | 3/2007 | Sussman et al. |
| 2008/0052219 A1 | 2/2008 | Sandholm et al. |
| 2010/0034102 A1* | 2/2010 | Wang ................ H04L 43/0876 370/252 |
| 2010/0251290 A1 | 9/2010 | Kodialam et al. |
| 2010/0257054 A1 | 10/2010 | Martin et al. |
| 2010/0257058 A1 | 10/2010 | Karidi et al. |
| 2011/0016014 A1 | 1/2011 | Tonnison et al. |
| 2011/0258049 A1 | 10/2011 | Ramer et al. |
| 2013/0060601 A1 | 3/2013 | Kodialam et al. |
| 2013/0073387 A1 | 3/2013 | Heath |
| 2013/0073473 A1 | 3/2013 | Heath |
| 2014/0025509 A1 | 1/2014 | Reisz et al. |
| 2014/0046777 A1 | 2/2014 | Markey |
| 2014/0100943 A1 | 4/2014 | Palihapitiya et al. |
| 2014/0213238 A1 | 7/2014 | Giraud et al. |
| 2014/0351046 A1 | 11/2014 | Carlyle et al. |
| 2014/0365317 A1 | 12/2014 | Goel et al. |
| 2015/0081856 A1 | 3/2015 | Rider |
| 2015/0106191 A1 | 4/2015 | Ge et al. |
| 2015/0039418 A1 | 5/2015 | Baluja et al. |
| 2015/0128162 A1 | 5/2015 | Ionescu |
| 2015/0332314 A1 | 11/2015 | Chakraborty et al. |
| 2015/0333992 A1* | 11/2015 | Vasseur ................ H04L 43/0876 370/252 |
| 2016/0062795 A1 | 3/2016 | Hu et al. |
| 2017/0261949 A1* | 9/2017 | Hoffmann .......... G05B 13/0265 |
| 2018/0330405 A1 | 11/2018 | Ashiru et al. |
| 2019/0327271 A1* | 10/2019 | Saxena ................ H04L 63/104 |
| 2019/0362290 A1* | 11/2019 | Rogynskyy ............ H04L 43/045 |
| 2020/0162503 A1 | 5/2020 | Stephan et al. |
| 2020/0177468 A1* | 6/2020 | Quachtran .............. H04L 41/16 |
| 2020/0195508 A1* | 6/2020 | Benjamin ............. H04L 67/125 |
| 2020/0349466 A1 | 11/2020 | Hoogerwerf et al. |
| 2021/0029580 A1 | 1/2021 | Gupta et al. |
| 2021/0035026 A1* | 2/2021 | Bansal ................ H04L 41/069 |
| 2021/0158260 A1* | 5/2021 | Kolar ................ H04L 41/0631 |
| 2021/0234782 A1* | 7/2021 | Ganapathi ........... H04L 43/0811 |
| 2021/0320871 A1* | 10/2021 | Savarese ................ G06N 3/088 |

* cited by examiner

MACHINE LEARNING-BASED PLAYBACK OPTIMIZATION USING NETWORK-WIDE HEURISTICS

BACKGROUND

Today media content (e.g., videos, movies, television, sports, music, etc.) streaming using a computer or even a smart phone connected to the internet is common place. To achieve a satisfactory quality of experience, there must be a strong internet connection. Other factors that can affect the quality of experience include latency, throughput, time to first frame, buffer occupancy, bit rate, buffer rate, and the like. For example, buffering may result in interrupted viewing sessions causing a low quality of experience. While network and device settings may be adjusted to improve streaming quality for a given device and over a given network, it may be difficult to determine which one of, or which combination of, parameters to adjust to improve media content streaming. It may further be difficult to dynamically change settings as the environment conditions change. This is especially true given the vast number of devices in use and variety of networks used.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
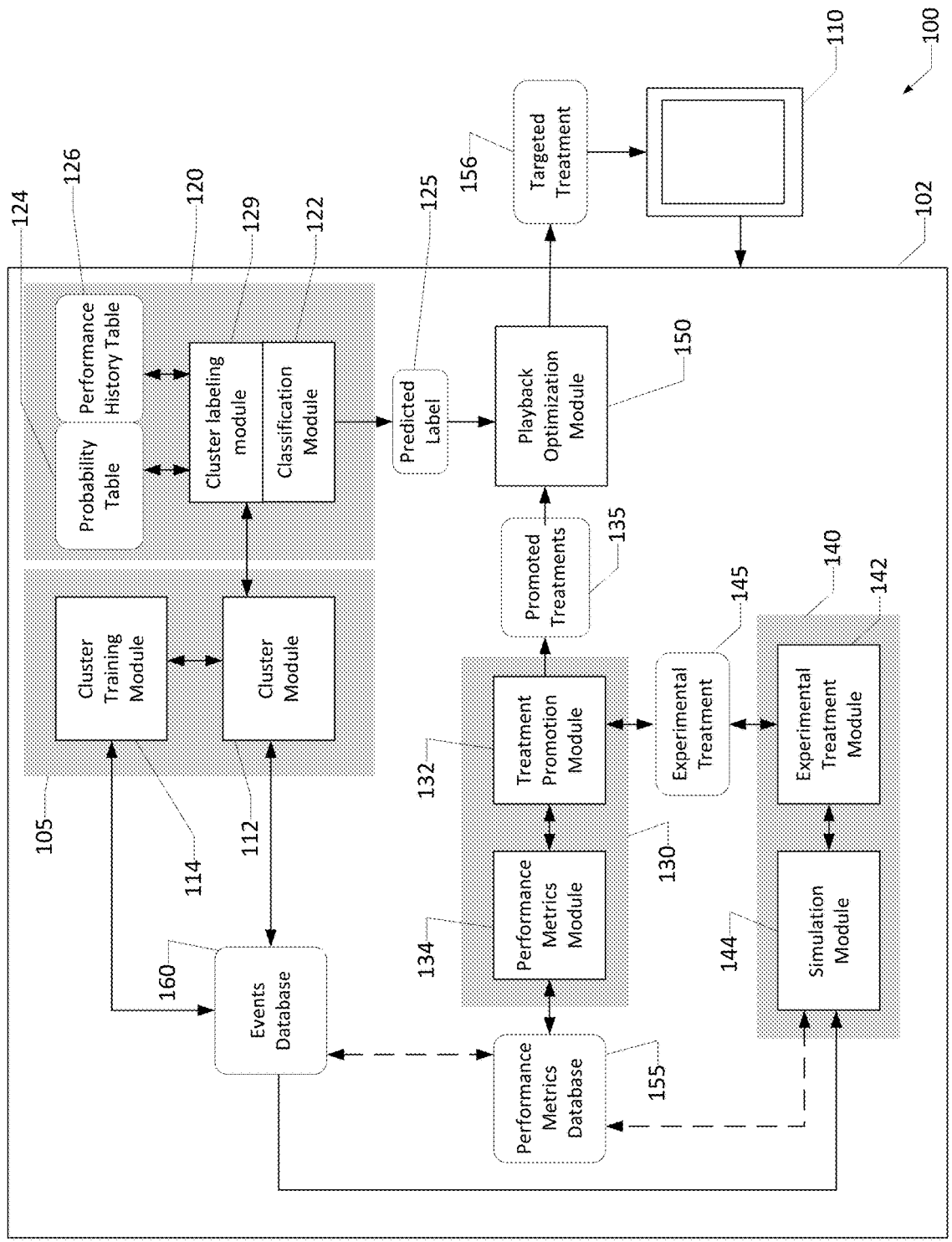
FIG. 1 is a schematic illustration of an example use case for determining a network label and an associated treatment, in accordance with one or more example embodiments of the present disclosure.

The systems and methods herein may be used to determine computer network performance, determine a type, group, cohort, or class of network, and determine various parameters or settings specific to a device and/or network to improve network performance. The network parameters (e.g., settings) may be adjusted by a device (e.g., computing device) to improve quality of experience (QoE) for a user using the computing device. In one example, the computing device may be used to stream media content, such as a movie, television show, or music, from a remote server over the Internet. The parameters for improving quality of experience may include parameters to control bitrate, buffer, and/or latency for example The network optimization system may involve a playback optimization service that interfaces with a computing device (e.g., smart phone, tablet, desktop computer, laptop computer, e-reader, wearable device, smart speaker, or the like) and sends the computing device parameters or settings, referred to herein as treatment parameters, that may be applied by the computing device and/or an application running thereon to improve network performance. These parameters may improve the quality of experience for the user by reducing buffering time, for example. The playback optimization service may determine the treatment parameter most likely to improve the quality of experience on the computing device and may promote that treatment parameter.

The network optimization system may include one or more clustering algorithms and one or more classification algorithms. The clustering algorithms may analyze network data (e.g., latency and throughput) from various other computing devices to determine groups and/or classes of network that have similar characteristics. For example, the groups or classes may have similar network characteristics such as average, min/max, and/or standard deviation/variance of throughput and latency. The classification algorithm may process network data (e.g., throughput and/or latency data) specific to the computing device and may determine which group or class of network the computing device and network belongs.

The network optimization system may further determine treatment parameters (e.g., network settings) appropriate for each group of class of networks using the clustering algorithm. For example, the network optimization system may determine that certain treatment parameters (e.g., one or more heuristic configuration parameters for controlling quality of experience on the computing device) improves the network performance and thus quality of experience on the computing device more than other parameters. Upon determining which network group or class the computing device and network belongs, the network optimization system may determine appropriate treatment parameters based on the group or class and/or other information such as the type or model of computing device, and may send the treatment parameters to the computing device to be applied by the computing device to improve network performance and/or quality of experience. This process may occur on the backend without requiring active participation from the user device. Alternatively, or additionally, the device may request such information.

The network optimization system may determine the treatment parameters by analyzing performance metrics from a library of performance metrics which may be determined from historical data. The library of performance metrics may include information about a group or class of networks and devices as well as various parameters related to the performance (e.g., average, min/max, standard deviation of network throughput, time taken from download of first byte to last byte of payload in any HTTP request) and latency (time taken from HTTP request of payload to download of its first byte)). Based on this information, the network optimization system may determine which network parameters correlate to improved network performance for each class. Additionally, the network optimization system may simulate the performance of computing devices (e.g., for popular computing devices) and may predict changes in network performance based on certain treatment parameters (e.g., settings that are available on the respective devices). Additionally, the network optimization system may analyze performance metrics of certain groups or classes of networks in near real time to update treatment parameters as networks and conditions evolve (e.g., based on traffic flow, usage, technical problems, and the like). In this manner the network optimization system may adapt to dynamic network conditions.

Referring to FIG. 1, an example use case 100 for determining a network group, cohort, or class corresponding to network performance on a computing system and determining treatment parameters based on the network group, cohort, or class is illustrated in accordance with one or more example embodiments of the disclosure. In the illustrated example, computing device 110 may communicate over the Internet with a server running network optimization system 102, which may be one or more servers. Computing device 110 may further communicate over the Internet with a server, which may be one or more servers for streamlining media content (e.g., movies, television, video content, music content, and the like). The streaming server and the server running the network optimization system 102 may be the same or different servers.

Computing device 110 may be any computing device that may communicate with one or more servers and/or other computing devices via any well-known wired or wireless system (e.g., Wi-Fi, cellular network, Bluetooth, Bluetooth Low Energy (BLE), near field communication protocol, etc.). Computing device 110 may be any computing device with a processor and may include one or more displays (e.g., touch screen display) and/or one or more speakers. In the example illustrated in FIG. 1, electronic device 110 is a smart phone device comprising a processor, a display and a speaker, however it is understood that computing device may be a tablet, desktop computer, laptop computer, e-reader, wearable device, smart speaker, or the like. Computing device 110 may run a local application to facilitate communication with a server running the network optimization system and/or streaming application and otherwise process instructions and/or perform operations based on commands received from the server or servers. The local application may be one or more applications or modules run on and/or accessed by computing device 110 (e.g., one or more modules illustrated in FIG. 11, described in more detail below). In example, the local application may include a clustering module, a classification module, and/or a playback optimization module for selecting appropriate treatments.

The server may be one or more computing devices (e.g., one or more servers) in communication with the computing device 110. For example, the server may be server 800 described in more detail below with respect to FIG. 8. The server may include one or more servers and/or otherwise communicate with other servers, databases, datastores, and the like. The server may be a computing device with a processor and may run one or more applications and/or platforms (e.g., network optimization system 102 and/or a media content streaming application) in communication with the local application running on electronic device 110. It is understood that, in one example, the computing device 110 and the server may coordinate to perform one or more of the operations described herein with respect to FIG. 1 or otherwise described herein.

The computing device 110, running the local application and in communication with the server may connect to the Internet (e.g., WiFi or cellular) and may be used to stream and display media content. Various network parameters such as, and/or related to, average, min/max, standard deviation of network throughput and latency, and the like may be collected or otherwise determined by the computing device 110 and communicated to the network optimization system 102 running on the server. Other information such as location may be communicated to the network optimization system. The computing device 110, running the local application, may automatically and periodically send this information to the network optimization system 102. Alternatively, network optimization system 102 may periodically request such information from the computing device 110. Additionally, the network optimization system may request network parameter information and/or data from various other computing devices (e.g., tens, hundreds, thousands, millions, etc. of other computing devices) and the aggregated network parameter information may be saved on server (e.g., events database 160).

The network information sent from the computing device 110 to the network optimization system 102 may include information such as network type, device type, location of computing device, and other relevant information, in addition to the network parameters. The network optimization system may save this information and data in events database 160 which may catalogue the information. The events database 160 may communicate and/or coordinate with performance metrics database 155, which may be a standalone component and/or database or a subcomponent of the events database 160. The performance metrics database 155 may include network parameter information relevant to the network performance of a device (e.g., buffer occupancy, ABR quality selection, and other adjustable settings). This information may be communicated to events database 160 and/or communicated directly to performance metrics database 155. It is understood that an implementation module running on the server may be used as an interface between the computing device 110 and the various modules and components of network optimization system 102.

The network data, information, and/or parameters saved on events data base 160 from computing 110 and/or from other computing devices in communication with the network optimization system 102 may be used by clustering system 105 to train one or clustering algorithms (e.g., one or more clustering neural networks or models). Clustering system 105 may include clustering module 112 and cluster training module 114, which may be standalone modules or may be the same module. Clustering module 112 may perform clustering using an un-supervised machine learning process to group similar networks into groups, classes and/or cohorts based on various network information, data and/or parameters (e.g., average, min/max, and/or standard deviation of network throughput and latency). The cluster training module 144 may be used to train the one or more algorithms executed on clustering module 112 using well known machine learning training techniques. The clustering model may be periodically trained as the events database 160 is updated with new data. The cluster training module 114 may be designed to periodically retrain the clustering algorithm of cluster module 112 at set periods of time (e.g., every 1, 5, 10, 15 minutes) or based on a detected amount of new information determined by the events database 160. This may occur during a streamlining session on a device and/or while the device is offline. It is understood that the data used to train the cluster model may not include any data determined and/or generated by computing device 110.

Upon determining the network groups, classes and/or cohorts using the cluster module 112, network data, information and/or parameters from computing device 110 may be processed and/or used by classification system 120 to determine which group, class and/or cohort of networks the network data, information and/or parameters corresponding to the computing device 110 corresponds to (e.g., which network group it is most similar to). The classification system 120 may include a classification module 122, cluster labeling module 129, a probability table 124 and/or a performance history table 126. Cluster module 112 may be in communication with cluster labeling module 129.

The classification module 122 may include one or more classification algorithms (e.g., one or more classification neural networks or models). Clustering is the process of predicting the group, class, or cohort of networks corresponding to network data from the computing device, information and/or parameters (e.g., for a given media content streaming session). It is understood that the clustering and/or classification process may further be informed by the history of assigned groups, classes, and/or cohorts from the past for that computing device. In one example, the computing device and/or network may be assigned unique identification value which may be used to track the performance of that device. The cluster labeling module 129 may be in communication with classification module 122 and/or cluster module 112 and may employ clustering algorithms and/or techniques to determine probability table 124 and/or performance history table 126 based on the output of classification module 122. It is understood that cluster labeling module 129 and classification module 122 may be different modules or may be the same module.

The performance history table 126 may maintain a history of performance data, information, and/or parameters (e.g., network settings) relevant to the computing device 110. This information may be catalogued and may be used as an input to the classification algorithm. The probability table 124 may be determined based on the performance history table 126 and may predict network performance information such as performance parameters and/or settings for a given time, for a given network, for a type of media content and/or streaming service, and/or based on network traffic characteristics. The probability table 124 may be used as an input to the classification algorithm or otherwise may inform the classification module and in this way the classification determination may be information by historical data respective to that device.

The output of the classification module may be predicted label 125 which may correspond to a predicted network group, class and/or cohort identified by the cluster module 112. The predicted label determined by the classification module 122 may be saved to the performance history table 126 in a label history. The predicted label may associate the network data of the computing device 110 with similar networks and/or devices that have been assigned the same label. Accordingly, computing devices assigned the same label may be expected to share certain network parameters, performance and/or characteristics in common. It is understood computing devices with the same label may further share certain similarities regarding location and/or device type. It is further understood that predicted label 125 may be based on network type, device type, location of computing device, and the like. The predicted label may be sent to and/or otherwise shared with playback optimization module 150, which may be designed to receive promoted treatments 135 from treatment system 130 and may use the predicted label 125 to determine a targeted treatment from the promoted treatments 135 based on predicted label 125.

Treatment system 130 may include treatment promotion module 132 and performance metrics module 134. Treatment promotion module may determine promoted treatments 135 (e.g., treatment parameters and/or settings) based on the predicted label determined by classification system 120. The treatment promotion module 132 may include a heuristic algorithm to select and/or control treatment parameters such as ABR quality selection, buffer occupancy, buffer rate, or buffer size, and the like. The promoted treatments 135 may include treatments (e.g., network settings) to cause the computing device and/or an application computing device to adjust and/or modify network settings on the device to improve network performance. The promoted treatments 135 may be sent to the playback optimization module 150 which may be responsible for determining the best and/or optimal treatments for a given label and may promote the best and/or most optimal treatments as targeted treatment 156.

The treatment promotion module 132 may communicate and/or coordinate with performance metrics module 134 which may be in communication with performance metrics database 155. The performance metrics module 134 may consume and/or analyze metrics determined form performance metrics database 155 and may compute a quality of experience (QoE) score for different network parameters and/or data and corresponding network performance metrics. For example, if certain network settings result in low latency and buffering, those network settings may be correlated to a high quality of experience score. The performance metrics module may catalogue the network settings that correspond to high quality of experience scores and may determine which network group, class or cohort such information corresponds to. It is understood that the metrics analyzed by performance metrics module 134 may or may not involve any data and/or information determined or generated by computing device 110.

The promoted treatment 135 may be communicated from the treatment system 130 to the playback optimization module 150. As explained above, the playback optimization module may interface with the computing device 110 (e.g., via an implementation module) and may be responsible for sending network parameters (e.g., treatments) to computing devices for improving the quality of experience (QoE) on the computing device based on the predicted label for that computing device. It is understood that certain device specific policies informed by past performance of the computing device 110 and/or devices similar to computing device 110 may further inform the selection of treatments on playback optimization module 150.

Treatment optimization system 102 may further include simulation system 140. Simulation system 140 may determine experimental treatments 145 based on a simulation of the network performance of computing device 110. Simulation system 140 may include simulation module 144 and experimental treatment promotion module 142. Simulation module 144 may be in communication with events database 160 and optionally performance metrics database 155. Simulation module 144 may run a heuristics simulator to execute multiple playback simulation scenarios based on information in the performance metrics database 155 and/or events database 160 and/or other publically available network related information.

The simulation may simulate, based on certain network conditions, device conditions and/or settings, and/or environment conditions (e.g., time and/or network traffic) and determine corresponding network performance and/or a corresponding quality of experience score for a device and/or network. Experimental treatment promotion module 142 may analyze this information, data and/or results and determine treatment parameters based on these simulations. Simulation module 144 may modify and/or adjust several different network settings available to the computing device and may determine (e.g., predict) the effect on network performance. The experimental treatment 145 may be sent to treatment system 130 for consideration and/or deployment by treatment promotion module 132. In one example, simulation module 144 may maintain simulations for various types of computing devices and/or software systems.

Illustrative Process and Use Cases

Figure 2:
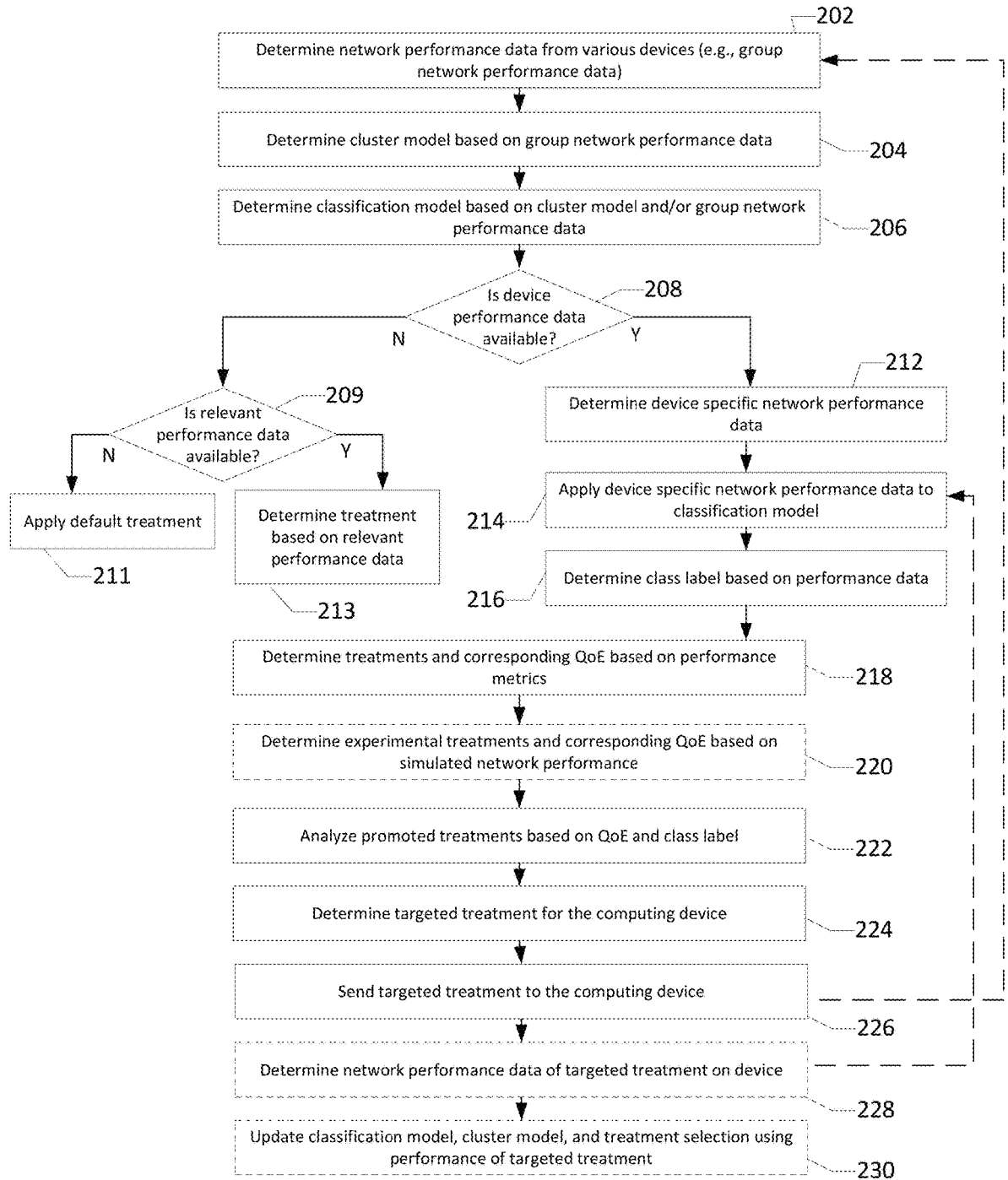
FIG. 2. is a schematic illustration of an example process flow for determining a network label and an associated treatment, in accordance with one or more example embodiments of the present disclosure.

FIG. 2 depicts example process flow for determining a cluster model, determining a classification model, determining a class label, and determining a treatment based on the class label. Some or all of the blocks of the process flows in this disclosure may be performed in a distributed manner across any number of devices (e.g., servers and computing devices). Some or all of the blocks of the process flows in this disclosure may be performed in a distributed manner across any number of devices. Some or are all of the operations of the process flow may be optional and may be performed in a different order.

At block 202, computer-executable instructions stored on a memory of a device, such as a server, may be executed to determine network performance data (e.g., throughput and/or latency data) for various computing devices (e.g., group network performance data). For example, the computing devices may run a local algorithm that periodically (e.g., at set periods of time) sends network performance data to the network optimization system. Alternatively, the network optimization system may periodically request such information from the computing devices. For example, the network performance data may include information such as average, min/max, and/or standard deviation of network throughput and/or latency, or other well-known network parameters.

At block 204, computer-executable instructions stored on a memory of a device, such as a server, may be executed to determine a cluster model based on the network performance data from various devices (e.g., group network performance data). The cluster model may be one or more clustering algorithms (e.g., cluster neural networks) trained using the group network performance data. The cluster models may determine multiple network classes, groups, and/or cohorts. At block 206, computer-executable instructions stored on a memory of a device, such as a server, may be executed to determine a classification model that may include one or more classification algorithms (e.g., classification neural networks). The classification model may be based on the cluster model and/or the group network performance data. The classification model may use network performance data (e.g., latency and/or throughput data) as input and may output a label indicative of a certain networks group, class and/or cohort that corresponds to one of the groups, classes, and/or cohorts identified by the cluster model. It is understood that other information from the probability table, performance history table and/or other information such as location may be used as an input.

At decision 208, computer-executable instructions stored on a memory of a device, such as a server, may be executed to determine whether device specific network performance data is available. For example, a performance history table may include network performance data specific to the computing device. If there is not device specific network performance data available, at decision 209, computer-executable instructions stored on a memory of a device, such as a server, may be executed to determine whether there is relevant network performance data available. Relevant network performance data may include network performance data corresponding to the same device, network, and/or location, for example. If there is relevant network performance data available, at block 213 computer-executable instructions stored on a memory of a device, such as a server, may be executed to determine a treatment associated with the relevant network performance data and apply the treatment to the device. Alternatively, if there is no relevant performance data available, at block 211, computer-executable instructions stored on a memory of a device, such as a server, may be executed to send the device a default treatment. In one example, the default treatment may be based on the type of device and/or network.

If there is network performance data available at decision 208, at block 212, computer-executable instructions stored on a memory of a device, such as a server, may be executed to determine network performance data specific to the computing device. This data may include, min/max, average, and/or standard deviation of latency and throughput, for example. At block 214, computer-executable instructions stored on a memory of a device, such as a server, may be executed to apply the network performance data specific to the computing device to the classification model to determine which group, class or cohort of networks corresponds to the network performance data. At block 216, computer-executable instructions stored on a memory of a device, such as a server, may be executed to determine a class label based on the network performance data using the classification model, the class label corresponding to a networks group, class or cohort. The network optimization system may archive the label and/or network performance data.

At block 218, computer-executable instructions stored on a memory of a device, such as a server, may be executed to determine treatments for each class label. Each treatment determined may be associated with a quality of experience (QoE) score that may be known and/or calculated or estimated using performance metrics. At optional block 220, computer-executable instructions stored on a memory of a device, such as a server, may be executed to determine experimental treatments based on stimulated network performance. As explained above, the network parameters and network performance on computing device may be simulated by adjusting various network settings that may be adjusted on the computing device to optimize the network performance.

At block 222, executable instructions stored on a memory of a device, such as a server, may be executed to determine promoted treatments based on quality of experience (QoE) scores computed or otherwise determined for the treatments determined at blocks 218 and/or 220. Based on the quality of experience score, the treatment optimization system may determine to promote certain treatments and not others. At block 224, executable instructions stored on a memory of a device, such as a server, may be executed to determine a targeted treatment for the computing device based on the label. The treatment optimization system may further employ certain policies to determine the best treatment (e.g., of the promoted treatments) to send to the computing device. The policies may be based on past performance metrics for the computing device and/or devices similar to the computing device or networks similar to the network on the computing device. The policies may be a set of rules that ultimately guide the treatment decision. In some cases, block 218 and optional block 220 may occur earlier in time (e.g., prior to block 202). In one example, one treatment may be promoted over another if the quality of experience score exceeds a threshold value or is larger than the quality of experience value of another treatments.

At block 226, executable instructions stored on a memory of a device, such as a server, may be executed to send the targeted treatment (e.g., the best and/or most optimal treatment) to the computing device. The treatment optimization system may send instructions to adjust network settings based on the treatment. The treatment optimization system may optionally reinitiate steps 202 and so on to retrain and/or update the cluster model and classification model using updated, different, and/or additional group network performance data. This may capture real time and/or near real time changes across the various devices associated with the group network performance data.

At optional block 228, executable instructions stored on a memory of a device, such as a server, may be executed to determine network performance data corresponding to the treatment sent to the computing device. In other words, the effects on the network on the computing device caused by the change in network settings based on the treatment may be determined. As explained above, the computing device may periodically send this information to the network optimization system and/or the network optimization system may periodically request this information. Upon determining the network performance data of targeted treatment, block 214 and so on may optionally be repeated to determine updated treatments based on the performance of the network after applying the targeted treatment. Specifically, the new network performance data corresponding to adjusted network settings based on the treatment may be processed by the classification system to determine if a different label is more appropriate.

At optional block 230, executable instructions stored on a memory of a device, such as a server, may be executed to update, modify and/or train the classification model, cluster model and/or treatment selection algorithm based on the network performance data corresponding to the adjusted network settings based on the treatment. Whether the network performance improved or worsened, this feedback may be used to improve the classification model, cluster model and/or treatment selection algorithm.

Figure 3:
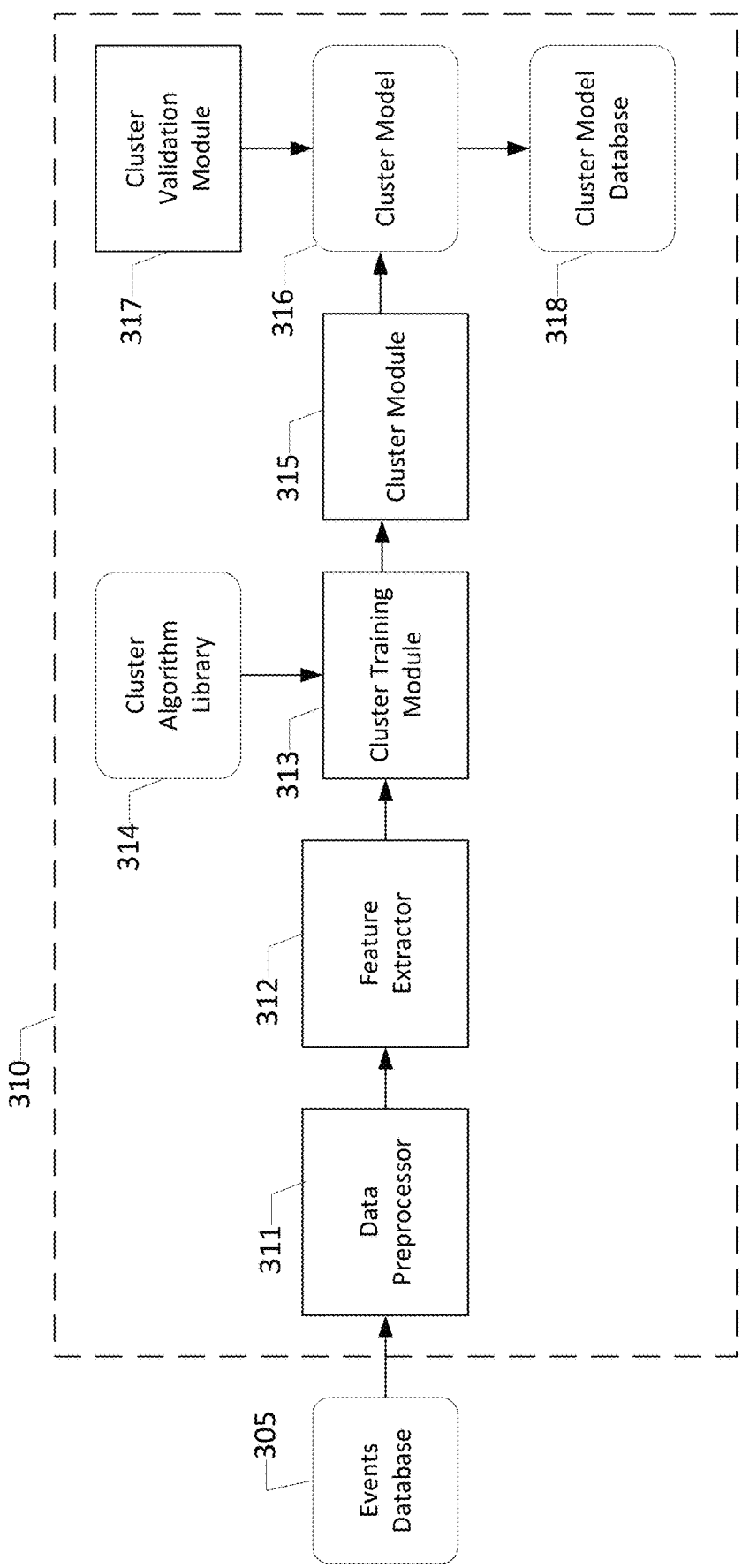
FIG. 3 is a schematic illustration of example data flow for determining a cluster model and training the cluster model, in accordance with one or more example embodiments of the present disclosure.

FIG. 3 is a schematic illustration of an example use case for determining a cluster module, training the cluster model, and validating the cluster model. The process illustrated in FIG. 3 may be performed by cluster system 310, which may be the same as cluster system 105. As shown in FIG. 3, the cluster system 310 may be in communication with events database 305 which may be the same as events database 160. Events database 305 may be in further communication with a performance metric database similar to performance metrics database 155. The cluster system 310 may be used to periodically train cluster models.

As shown in FIG. 3, the cluster system 310 may include data preprocessor 311, feature extractor 312, cluster training module 313, cluster module 315, and cluster validation module 317. The data preprocessor 311 may determine network performance data from the events database 305 and/or a performance metrics database and may pre-processes such data to remove any outliers (e.g., using well-known techniques) and otherwise prepare such data to be used to train a cluster model. The feature extraction module may determine and/or calculate features from the network performance data that are useful and/or necessary for cluster model training. For example, the feature extraction module 312 may extract features such as average, min, max, standard deviation, and/or variance of throughput and latency.

The preprocessed data that has had features extracted may then be passed and/or sent to the cluster training module 313. The cluster training module 313 may be the same as cluster training module 114 and may be used to train cluster models based on the data received from the events database 160 (e.g., including features determined from such data). The cluster training module may choose from various cluster models from cluster algorithm library 314. For example, cluster algorithm library 314 may maintain various types of cluster models such as K-Means, Gaussian mixture models, K-Medoid or other well-known models and/or algoirthms for un-supervised clustering. The cluster training module may be designed to choose one model by default or may choose the model based on certain criteria such as network type, device type, archived network performance, and the like.

The cluster training module, using the cluster model selected from the cluster algorithm library may then train the model selected from the cluster algorithm library 314 using the data from data preprocessor 311 and feature extractor 312 and may work together with cluster module 315 to determine cluster module 316. It is understood that cluster module 315 and cluster training module 313 may be the same module. As events database 305 is updated with the network performance data, cluster training module 313 may periodically retrain the model selected from cluster algorithm library 314 and/or select a new model and train the new model selected using the updated network performance data.

The cluster system 310 may further validate the cluster model 316 using cluster validation module 317. For example, multiple different types of cluster models may be selected from cluster algorithm library 314 and trained using cluster training module 313 using the data received from events database 305. In one example, the different models may be K-Means, Gaussian mixture models, and K-Medoid. Cluster validation module 317 may compare the accuracy of the different models to determine the quality of each model with respect to the others. For example, cluster validation module may use network performance data that corresponds to distinct groups, classes or cohorts that are known and may determine how accurate the various models are identifying the known groups, classes or cohorts. The most accurate model may be used. The trained models may be saved to cluster model database 318. It is understood that the cluster system 310 may determine cluster models while the computing device 110 is offline. In this manner cluster system 310 may process data to determine trends over long periods of time using vary large amounts of data. Alternatively, or additionally, it is understood that the cluster system 310 may determine cluster models while the computing device 110 is online (e.g., during a media content streaming session). In this manner, the cluster system 310 may adjust the cluster model in near real-time to facilitate near real-time changes in targeted treatments.

Figure 4:
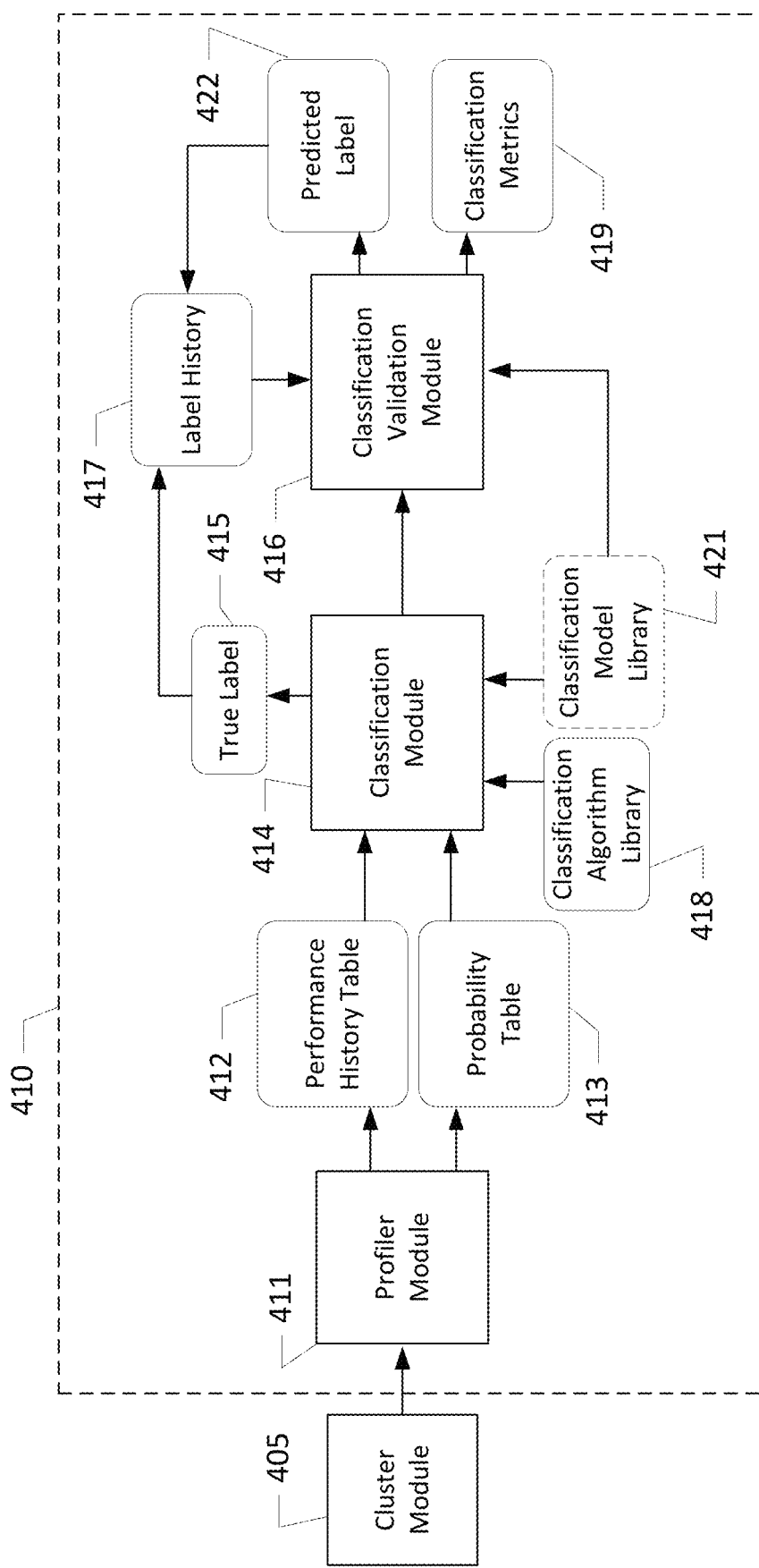
FIG. 4 is a schematic illustration of example data flow for determining a classification model and validating the classification model, in accordance with one or more example embodiments of the present disclosure.

FIG. 4 is a schematic illustration of an example use case for determining a classification module, training the classification model, and validating the classification model. The process illustrated in FIG. 4 may be performed by classification system 410, which may be the same as cluster module 112. As shown in FIG. 4, the classification system 410 may be in communication with cluster module which may be the same as events database 160. The classification system 410 may be used to periodically train classification models.

As shown in FIG. 4, the classification system 410 may include profiler module 411, classification module 414, and classification validation service 416. The profiler module 411 may be in communication with cluster module 405 and/or may be in communication with other components of cluster system 310. The profiler module 411 may determine performance metrics data and may identify performance metrics data and other information optionally including information specific to the computing device.

Using the performance metric data specific to the computing device, the profiler module 411 may determine performance history table 412 and/or a probability table 413 for each device, for a network, for a user profile and/or any combination thereof. This information may be determined and/or collected by profiler module 411 periodically (e.g., every minute, every 5 minutes, every 10 minutes, every 15 minutes, and so on) or as otherwise instructed by the playback optimization system. The performance history table 412 may be the same as performance history table 126 of FIG. 1 and may be a database or archive of the device, network, and/or user profile performance data at various times. Other relevant information such as network type and/or location may be determined a saved by performance history table 412.

Using the performance metrics data, the performance history table 412 and/or probability table 413, classification module 414 may determine a classification model and/or train the classification model to output a true label 415 to determine a label indicative of a network class, group or cohort associated with the performance history data. It is understood that the data applied to the classification module 414 may be specific to a media content streaming session and/or may be limited to a period of time (e.g., 5 minutes, 10 minutes, 15 minutes, etc.). The type of classification module may be selected from classification algorithm library 418 which may maintain various types of classification algorithms and/or models. Further, the classification module 414 may maintain a library of trained classification models in the classification model library 121.

In one example, the performance history table 412 may facilitate time correlation of classification labels, predicting labels based on relevant historic data (e.g., for a time-of-day, day-of-week, etc.). The performance history table 412 may further provide input with respect to peak/non-peak information and other network traffic information. The probability table 412 may be the same as probability table 124.

The classification validation module 416 may be used to validate the classification model determined by classification module 414. The true label 415 may be archived in label history. The label may be archived with respect to a device, network, and/or user profile identifier. The classification validation module may determine a predicted label 422 indicative of a predicted performance of a computing device. The predicted label 422 and/or true label 415 may be saved in label history 417. The classification validation module 416 may compare the predicted labels to the true labels to perform validation of the trained classification models in classification model library 421. In one example, using a known label corresponding to certain network performance data and a predicted label, the classification validation module may determine if the correct label is output. This provides a way to measure the accuracy of classification models. The classification system 410 may produce models with improved accuracy as the clustering module takes into account time and network traffic via the performance history table 412 and/or probability table 413. The classification metrics 419 may archive the results of the classification validation module, which may be consulted to determine which classification module to select as a default and/or to otherwise promote.

Figure 5:
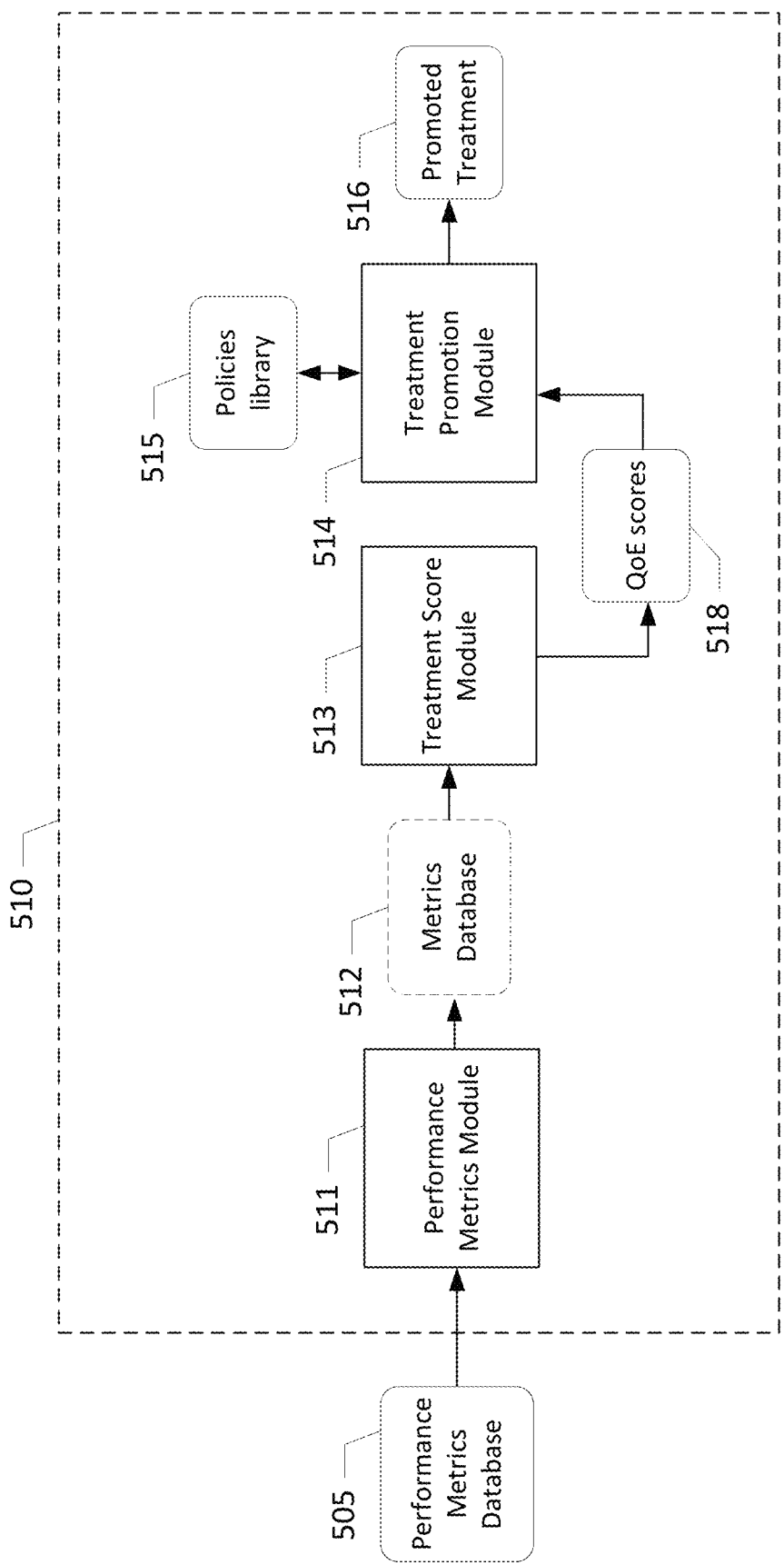
FIG. 5 is a schematic illustration of example data flow for determining treatments based on performance metrics, in accordance with one or more example embodiments of the present disclosure.

FIG. 5 is a schematic illustration of an example use case for determining a treatment using performance metrics and quality of experience (QoE) scores. The process illustrated in FIG. 5 may be performed by treatment system 510, which may be the same as treatment system 130. As shown in FIG. 5, the treatment system 510 may be in communication with performance metrics database 505 which may be the same as performance metrics database 155. The treatment system 510 may be periodically updated using new performance metrics to determine updated treatments and in this way may adjust to a dynamic environment.

As shown in FIG. 5, the cluster system 510 may include performance metrics module 511, treatment score module 513 and treatment promotion module 514. The performance metrics module 511 may determine performance metrics from performance metrics database 505. For example, the performance metrics module 511 may periodically query the performance metrics database for performance metrics. The performance metrics data may be associated, or may be associated by performance metrics module 511, with a network group, class, or cohort, and/or may be associated with a type of device, a type of network, and/or a user profile. The type of performance metrics data may include, for example, the buffer rate, the percentage of data (e.g., sessions) that streamed without buffering, percentage of data (e.g., sessions) that streamed with 1 buffering event, percentage of fragments delivered in 920p and above resolution during the session, percentage of fragments that was delivered in 4k (3640×2160) during the session, percentage of time spent buffering during the session, time to first frame, latency, throughput, and other related and well-known metrics. The processed performance metrics data may optionally be saved to the metrics database 512. For example, the metrics database may save performance metrics data organized according to device, network, and/or user profile. It is understood that the performance metrics module 511 may receive simulated and/or experimental performance metrics (e.g., from simulation system 140) and may similarly process this data and/or save this data on the metrics database 512.

The performance metrics data, such as data saved to the metrics database 512, may be analyzed by treatment score module 513. This may optionally include the experimental and/or simulated performance metrics. Treatment score module 513 may determine from the performance metrics data, one or more treatments (e.g., network settings) associated with the performance metrics data and compute quality of experience (QoE) scores 518 for each treatment identified. The quality of experience score may be determined using algorithms (e.g., neural networks) trained using predicted customer feedback and/or actual customer feedback. The quality of experience score may be saved in the metrics database 512 and may be associated with the identified treatment.

The quality of experience scores may be sent to the treatment promotion module 514 and may be analyzed by the treatment promotion module 514. Based on the quality of experience scores, the treatment promotion module 514 may determine certain policies (e.g., rules) to promote certain treatments and may optionally associate such treatments to select groups, classes, or cohorts, for certain devices, and/or for user profiles. For example, one treatment may be promoted over another if the quality of experience score exceeds a threshold value or is larger than the quality of experience value of another treatment. The treatment promotion module may maintain polices in policies database 515 and may update policies database 515 as time goes on and different treatments and quality of experience scores are determined. Based on the policies, the treatment promotion module 514 may promote one or more treatments for a given groups, classes, or cohorts, for certain devices, and/or for user profile. It is understood that the policies in policies database 515 may vary depending on the type of media content streamed. For example, there may be strict policies set for live events to maintain quality streaming. In one example, the zero error rate, zero buffer rate, percent of fragments delivered in 920 and above, and percent of time spent buffering must all be above a certain percentage values. Treatment promotion module 514 may then output promoted treatments 516.

Figure 6:
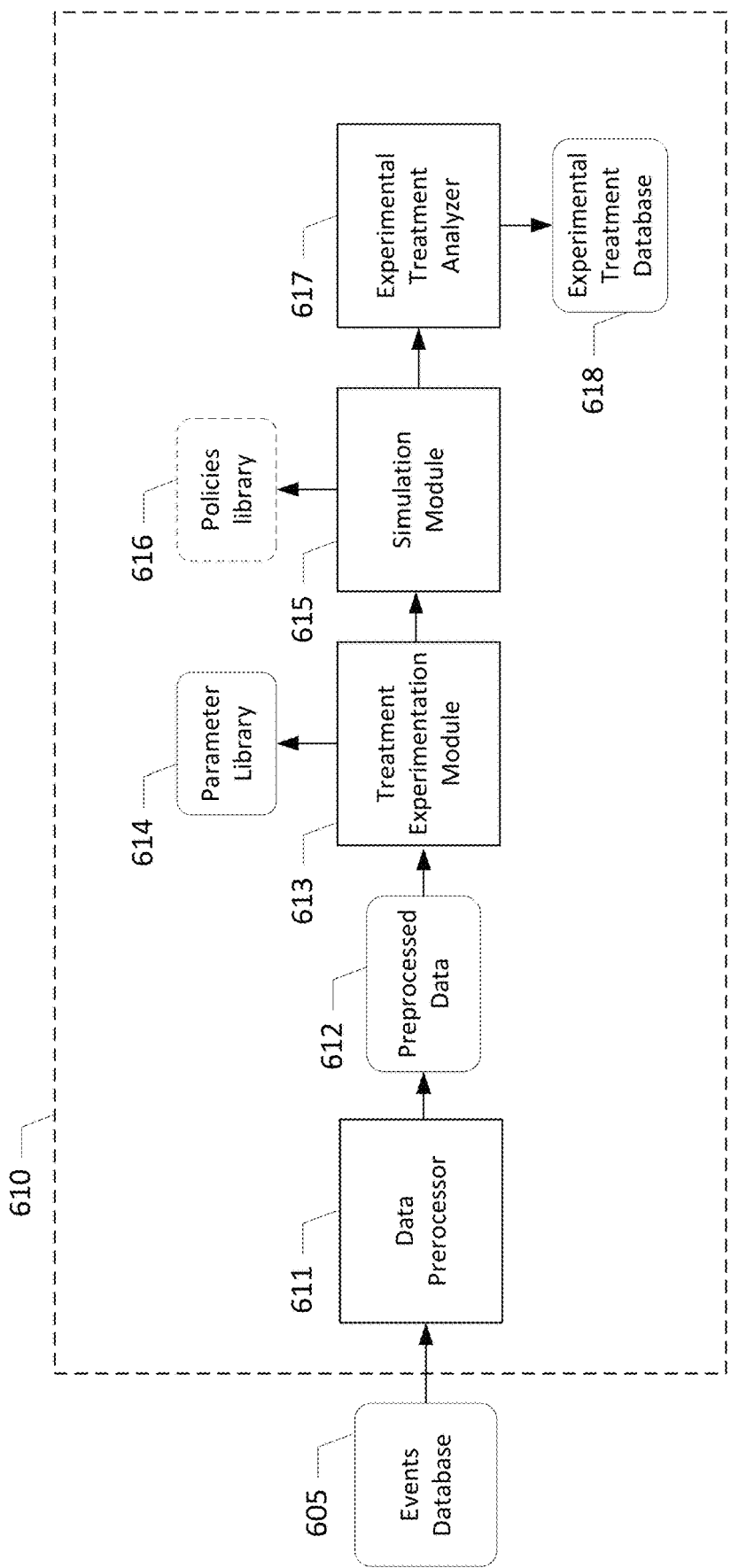
FIG. 6 is a schematic illustration of example data flow for determining treatments based on simulations, in accordance with one or more example embodiments of the present disclosure.

FIG. 6 is a schematic illustration of an example use case for determining simulated and/or experimental performance metrics data and corresponding treatments. The process illustrated in FIG. 6 may be performed by simulation system 610, which may be the same as simulation system 140. As shown in FIG. 6, the simulation system 610 may be in communication with events database 605 which may be the same as events database 160. The simulation system 610 may also be in communication a performance metrics database, such as performance metrics database 155.

As shown in FIG. 6, the simulation system 610 may include data preprocessor 611, treatment experimentation module 613, simulation module 615, and experimental treatment analyzer 617. The data preprocessor 611 may determine events data from the network data in events database 605 and may save the events data in preprocessed data 612. The network data in events database 605 may include data corresponding to network performance data for various devices, networks, and/or user profiles. The events day may be indicative of network performance at certain times, locations, using certain types of networks, or using certain types of devices. The events data may be used by the simulation system 610 to simulate certain streaming events and/or conditions (e.g., high network traffic). The events data may be sent or otherwise communicated to the treatment experimentation module 613.

Treatment experimentation module 613 may maintain parameter library 614. Parameter library 614 may include a library of network parameters (e.g., settings) that may be available to a computing device and manipulated by a computing device to optimize network performance. Such parameters may include, for example, ABR quality selection, buffer occupancy latency, and other well-known settings that may alter and/or otherwise affect network performance. The parameters in database 614 may be specific to a device type or model, an operating system, and/or a network type.

For a given event, situation, and/or condition (e.g., a given amount of network traffic, a given latency, etc.) based on the event data, the treatment experimentation module 613 may select various treatment parameters (e.g., settings) to adjust from the parameter library 614. The event data and the treatment selected from the parameter library 614 may be sent to the simulation module 615 to determine the predicted network performance based on the assigned treatment for the given event. The simulation module 615 may simulate one or more types of devices and/or operating systems and for a given event and selected treatments may determine the effect on the network performance. The output of the simulation module may be indicative of the predicted performance of the network based on the treatment.

The simulation module 615 may calculate a quality of experience score for each treatment or combination of treatments. Based on the quality of experience scores, the simulation module may determine certain policies (e.g., rules) to promote certain treatments for select network groups, classes, or cohorts, for certain devices, and/or for user profiles and may save the policies to optional policies database 616. For example, one treatment may be promoted over another if the quality of experience score exceeds a threshold value or is larger than the quality of experience value of another treatment. The quality of experience scores may be sent to the experimental treatment analyzer 617 and may be analyzed by the experimental treatment analyzer 617. Based on the quality of experience scores, certain experimental treatments may be promoted over others. The treatments, events data and/or corresponding quality of experience scores may be saved in experimental treatment database 618. In this manner, simulation system 610 may perform hyper parameter searches for optimal heuristic configurations guided by quality of experience (QoE) metrics.

Figure 7:
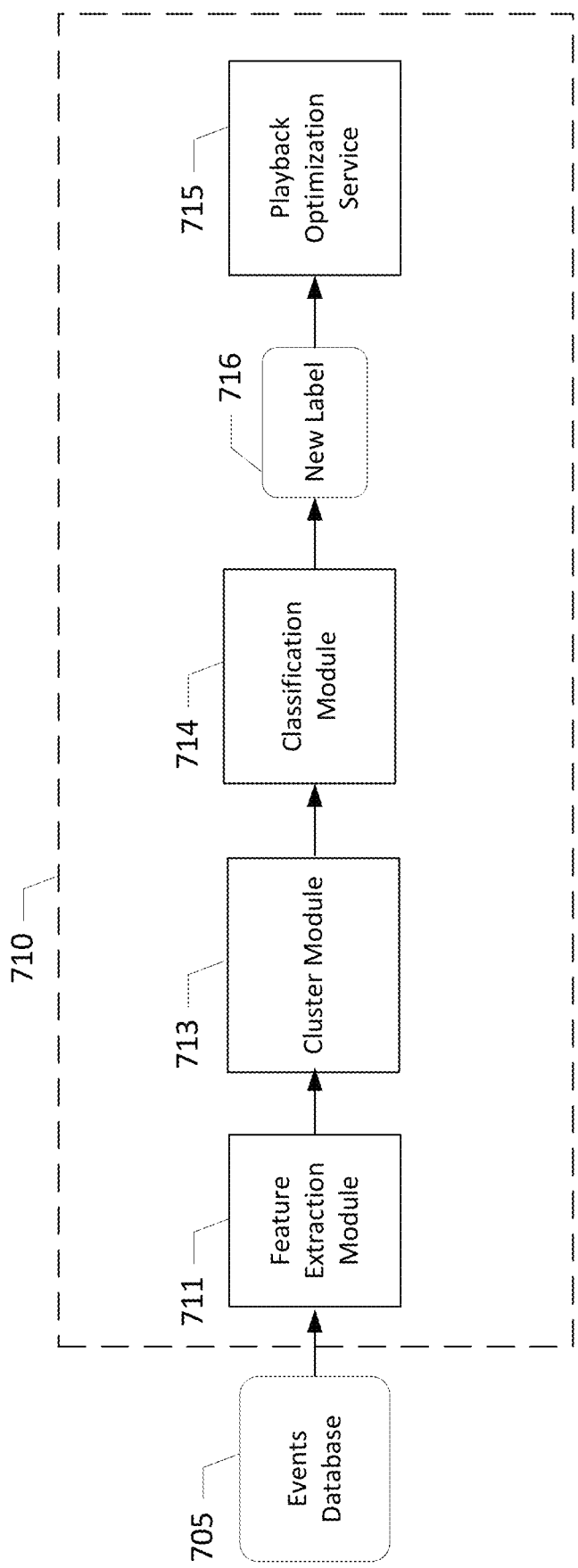
FIG. 7 is a schematic illustration of example data flow for mid-session updating of the classification module based on event data, in accordance with one or more example embodiments of the present disclosure.

FIG. 7 is a schematic illustration of an example use case for updating treatments (e.g., heuristic parameters) during a media-content streaming session. For example, the heuristic parameters may be updated periodically (e.g., 1 minutes, 5 minutes, 10 minutes, 15 minutes), at the direction of the treatment optimization system, and/or may be updated at the request of the computing device. In in the use case shown in FIG. 7, treatments for a given network class, group, or cohort, for example, may be updated dynamically to reflect changes in the environment conditions and/or promote the most optimal treatment parameters as the clustering and/or classification models improve with more data and training. This approach reduces classification inaccuracies (e.g., by periodically reclassifying a given network and promoting optimal treatments for the given network). This approach may be particularly useful for live streaming events which may experience dynamic network environments (e.g., variations in network traffic).

The process illustrated in FIG. 7 may be performed by dynamic system 710, which may be optionally included in the network optimization system (e.g., network optimization system 102) running on the server. As shown in FIG. 7, the dynamic system 710 may be in communication with events database 705 which may be the same as events database 160 of FIG. 1. Additionally, dynamic system 710 may be in communication a performance metrics database, such as performance metrics database 155.

As shown in FIG. 7, the dynamic system 710 may include feature extraction module 711, classification module 713, classification module 714, and playback optimization service 715. The feature extraction module 711 may determine and/or calculate features from the network performance data that is not specific to the computing device and/or performance metrics data specific to the computing device. For example, the feature extraction module 711 may extract features 712 such as average, min, max, standard deviation, and/or variance of throughput and latency. The extracted features may be specific to a device, location, network, or user profile. The extracted features may be sent to and/or communicated to the cluster module 713, which may be the as cluster module 112 of FIG. 1. The cluster module 713 may include and/or be in communication with one or more of the module or components described above with respect to cluster system 105 and/or cluster system 310.

As shown in FIG. 7, the extracted features may be applied to the cluster module 713 and the model and/or extracted features may be applied to the classification module 714, which may be the same as classification module 122 of FIG. 1. The classification module 714 may include and/or be in communication with one or more of the module or components described above with respect to classification system 126 and/or classification system 410. Using the classification system 714, a new label 716 may be determined based on the extracted features of feature extraction module 711. It is understood that this new label may be based on extracted features from network data specific to the computing device and/or network data that is not specific to the computing device (e.g., from other computing devices). The classification module 710 may save the new label to a label library and/or archive the label corresponding to the computing device. The new label may then be used to identify and/or determine one or more treatment parameters corresponding to the new label by playback optimization server 715. The treatment parameters may then be sent (e.g., after the certain period of time) to the computing device to update the treatment parameters to optimize the performance of the network. The new label will be used to update the treatment (e.g., using heuristic algorithm attributes, bandwidth caps) for a set period of time (e.g., 1 minute, 5 minutes, 10 minutes, 15 minutes, rest of the streaming session, etc.).

In one example, system optimization network may determine appropriate treatment parameters (e.g., network settings) and send the treatment parameters to the computing device. The message sent to the computing device with the treatment may instruct the computing device that new treatment parameters may be applied for a certain period of time. After sending the treatment parameters, the dynamic system 710 may determine newly generated events data and/or network performance data (e.g., after the network parameters were sent to the computing device) and may perform feature extraction on such data using feature extraction module 711. The events data and/or network performance data may either be specific to the computing device or may be received from related devices having one or more features in common (e.g., label, device, location, network, etc.). For example, the feature extraction module 711 may determine network parameter data such as, average thorough-put with variance and standard deviation and/or average latency with variance and standard deviation.

With this approach, inaccuracies in classification may be improved and network behavior on the computing device may be dynamically changed. For example, the network behavior may be dynamically changed in a streaming environment during live events. In this manner, network performance data from other devices may be used to determine treatment parameters to improve network performance. For example, the network optimization system may determine that devices in a certain region (e.g., city or country) and/or devices streamlining a certain event (e.g., a live sporting event) could improve network behavior by modifying certain network settings.

Alternatively, a similar to the approach to the one described above to implement mid-stream updates to heuristic parameters may be performed on a local application running on the computing device to dynamically update heuristic parameters. For example, the computing device may run dynamic system 710 and the network optimization system may send the computing device one or more cluster and/or classification modules to apply using network performance data determined by the computing device. The network optimization system may further provide the computing device with a promoted treatments that may be selected by the playback optimization service 715. The local application may locally determine network parameters such as average thorough-put with variance and standard deviation, average latency with variance and standard deviation (e.g., for a given period of time or streaming session) and may then use a classification executing on the computing device to determine a label associated with the network performance data. The local application may then determine, locally, the appropriate treatment or treatments (e.g., appropriate heuristic treatments) for the given label.

Figure 8:
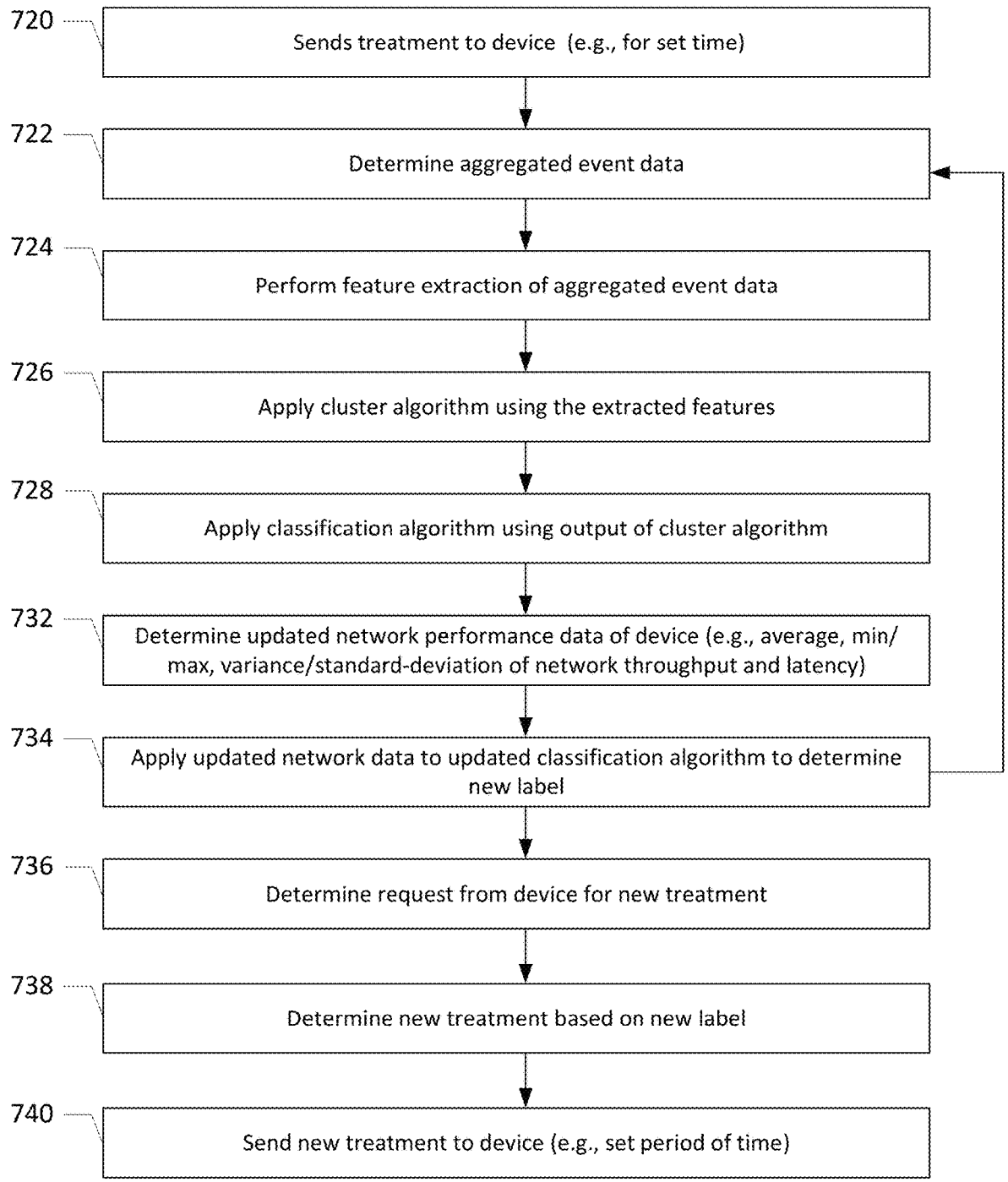
FIG. 8 is a schematic illustration of an example process flow for determining a network label and sending a device treatment upon receiving a request for treatment, in accordance with one or more example embodiments of the present disclosure.

FIG. 8 depicts example process flow for determining and applying a cluster model for adjusting, during a streaming session, heuristic configuration parameters via a network optimization system running on server. Some or all of the blocks of the process flows in this disclosure may be performed in a distributed manner across any number of devices (e.g., servers and computing devices). Some or all of the blocks of the process flows in this disclosure may be performed in a distributed manner across any number of devices. Some or are all of the operations of the process flow may be optional and may be performed in a different order.

At block 720, computer-executable instructions stored on a memory of a device, such as a server, may be executed to send a treatment to a computing device (e.g., a targeted treatment). Block 720 may be the same as block 226 of FIG. 2. It understood that instructions to use treatment for a set period of time and/or instructions to request a new treatment after a set period of time may also be sent to the computing device. At block 822, computer-executable instructions stored on a memory of a device, such as a server, may be executed to determine aggregated and/or group event data (e.g., network performance data) from various devices. Block 722 may be the same as block 204.

At block 724, computer-executable instructions stored on a memory of a device, such as a server, may be executed to perform feature extraction of the aggregated event data determined at block 722. For example, a feature extraction module may extract features such as average, min, max, standard deviation, and/or variance of throughput and latency from the aggregated event data. At block 726, computer-executable instructions stored on a memory of a device, such as a server, may be executed to apply the cluster algorithm using the features extracted at block 724. At block 728, computer-executable instructions stored on a memory of a device, such as a server, may be executed to apply the classification algorithm using the output of the cluster algorithm.

At block 732, computer-executable instructions stored on a memory of a device, such as a server, may be executed to determine updated network performance data (e.g., average, min/max, variance/standard-deviation of network throughput and latency). As this step may take place after block 920, the updated network performance data of the device may be determined after the device applied the treatment and thus may be indicative of the effect of the treatment on the performance of the network. Block 732 may be the same as block 228 of FIG. 2. At block 734, computer-executable instructions stored on a memory of a device, such as a server, may be executed to apply the updated network performance data to the updated classification algorithm to determine a new label based on the updated network performance data. The operations and process described with respect to block 214 of FIG. 2 may apply to block 734. At this point, block 722 may be reinitiated to repeat steps 722 to 734 to update the classification algorithm and determine a new label. This process may occur while the device is in use (e.g., during a streaming session) and/or may occur while the device is offline. In this manner, the treatment optimization system may update the cluster and classification algorithms in near real-time and may periodically update the targeted treatment in near real-time. It is understood that block 722 may alternatively be reinitiated at another point, such as at block 736.

At block 736, computer-executable instructions stored on a memory of a device, such as a server, may be executed to determine a request from the device for a new treatment. For example, the device may send a message to the treatment optimization system for new or refreshed treatments (e.g., after a set period of time has elapsed). At block 738, computer-executable instructions stored on a memory of a device, such as a server, may be executed to determine a new treatment based on the new label determined at block 734. The operations and process described with respect to block 226 of FIG. 2 may apply to block 738. At block 740, computer-executable instructions stored on a memory of a device, such as a server, may be executed to send the new treatment determined at block 738 to the computing device. Block 740 may be the same as block 920.

Figure 9:
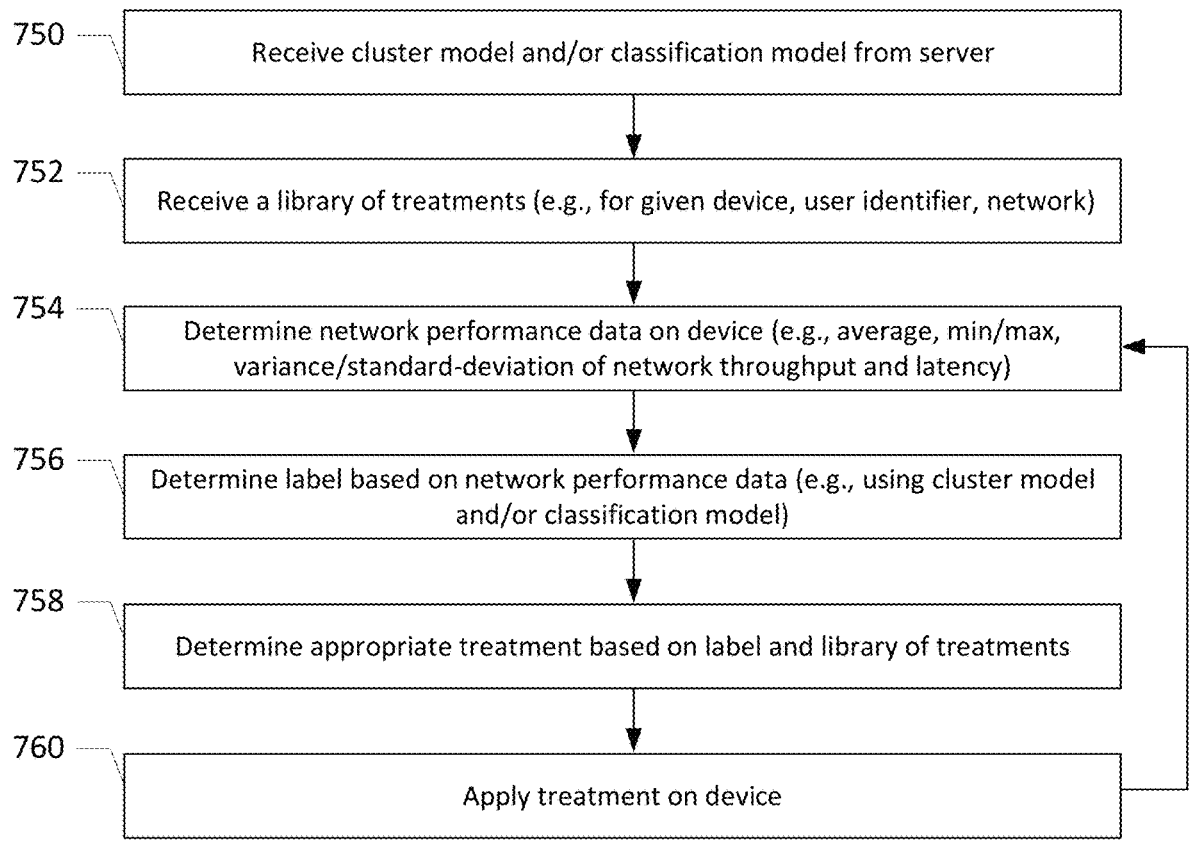
FIG. 9 is a schematic illustration of an example process flow for determining a network label and corresponding treatment on a device, in accordance with one or more example embodiments of the present disclosure.

FIG. 9 depicts example process flow for applying a classification model for adjusting, during a streaming session, heuristic configuration parameters via a local application running on computing device. Some or all of the blocks of the process flows in this disclosure may be performed in a distributed manner across any number of devices (e.g., servers and computing devices). Some or all of the blocks of the process flows in this disclosure may be performed in a distributed manner across any number of devices. Some or are all of the operations of the process flow may be optional and may be performed in a different order.

At block 750, computer-executable instructions stored on a memory of a device, such as a computing device, may be executed to receive a cluster model and/or a classification model from a server. The cluster model and/or classification may be trained by the server. For example, the classification model may be trained to perform clustering using an unsupervised machine learning process to group similar networks into groups, classes and/or cohorts based on various network information, data and/or parameters (e.g., average, min/max, and/or standard deviation of network throughput and latency).

At block 752, computer-executable instructions stored on a memory of a device, such as a computing device, may be executed to receive a library of treatments (e.g., promoted treatments). The library of treatments may be associated with a quality of experience score (QoE score), may be associated with a network class, cohort or group, and may be associated with a policy or rule. At block 754, computer-executable instructions stored on a memory of a device, such as a computing device, may be executed to determine network performance specific to the computing device. This may include, for example, average, min/max, variance/standard-deviation of network throughput and latency data on the computing device.

At block 756, computer-executable instructions stored on a memory of a device, such as a computing device, may be executed to determine a label based on the network performance data. For example, the computing device may apply the network performance data to the cluster model and/or classification model to output a label indicative of a network group, cohort or class.

At block 758, computer-executable instructions stored on a memory of a device, such as a computing device, may be executed to determine an appropriate treatment (e.g., targeted treatment) based on the label determined at block 756 and the library of treatments. For example, the treatments may be catalogued according to labels and may each include a corresponding quality of experience score. The computing device may determine the treatment that corresponds to the label and has the highest quality of experience score or has at quality of experience score above a threshold value.

At block 760, computer-executable instructions stored on a memory of a device, such as a computing device, may be executed to apply the treatment on the computing device to improve network performance. At this point, step 754 may be reinitiated to continuously determine updated labels and appropriate treatments (e.g., after a set period of time). It understood that block 754 may be reinitiated at any other point, such as block 758. It is further understood that the computing device may periodically receive updated cluster models and/or updated classification models (e.g., from a server).

Illustrative Device Architecture

Figure 10:
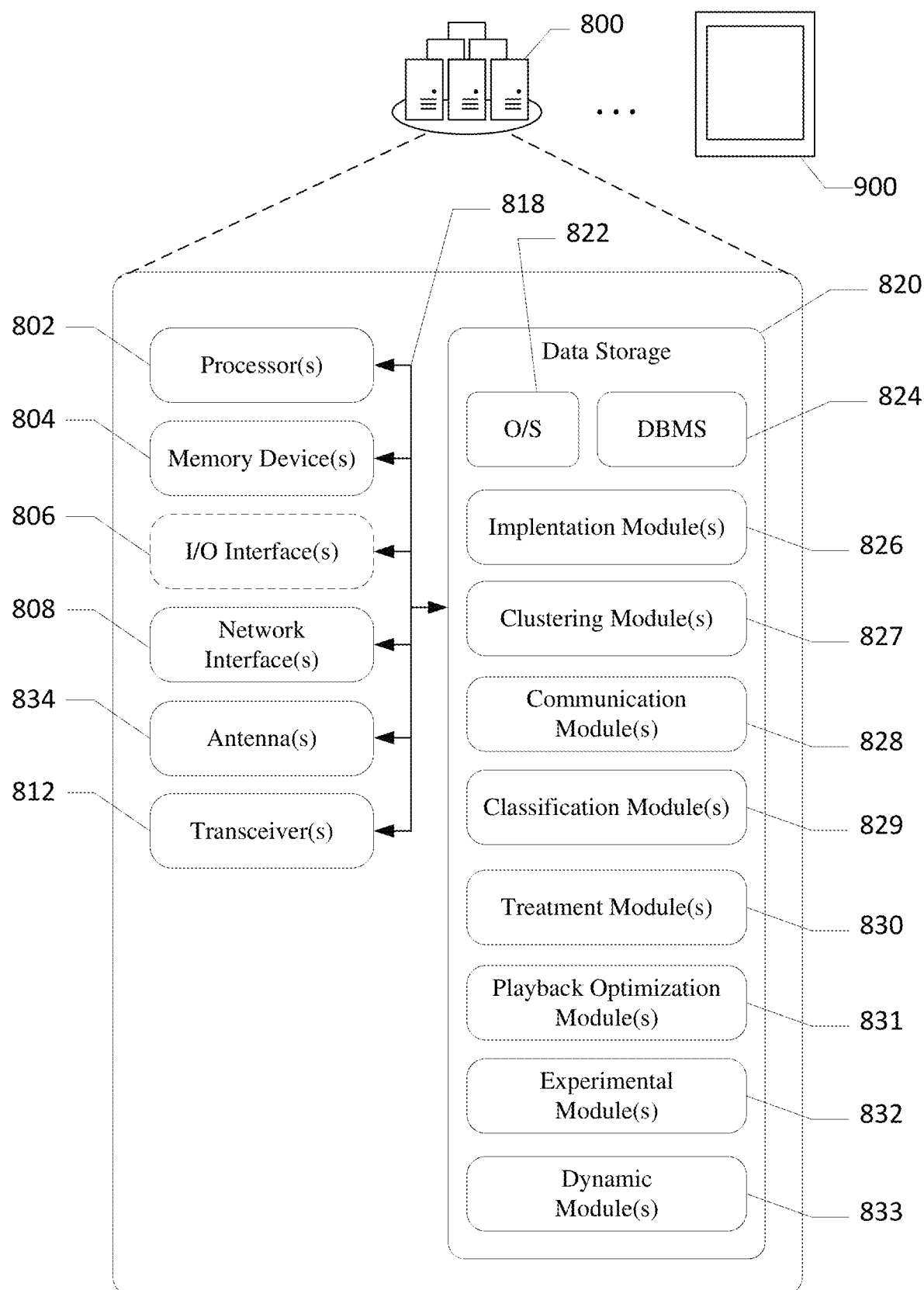
FIG. 10 is a schematic block diagram of a server in accordance with one or more example embodiments of the disclosure

FIG. 10 is a schematic block diagram of an illustrative sever 800 in accordance with one or more example embodiments of the disclosure. The server 800 may be one or more servers and may include any suitable computing device capable of receiving and/or sending data, and may optionally be coupled to devices including, but not limited to, computing devices such as a connected device, smartphone, tablet, smart television, e-reader, one or more user devices (e.g., wearable devices and/or smart sensors), a desktop computer, a laptop computer, one or more servers, datastores, or the like. The server 800 may correspond to an illustrative device configuration for any servers of FIGS. 1-9 and/or any computing devices running the network optimization system. As explained above, server 800 may be one or more servers and the treatment optimization system may run on the one or more servers of server 800. Computing device 900 may be the same as computing device 900 of FIG. 11.

The server 800 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 800 may include one or more processors (processor(s)) 802, one or more memory devices 804 (generically referred to herein as memory 804), one or more of the optional input/output (I/O) interface(s) 806, one or more network interface(s) 808, one or more transceivers 812, and one or more antenna(s) 834. The server 800 may further include one or more buses 818 that functionally couple various components of the server 800. The server 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the server 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the server 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more implementation module(s) 826, one or more clustering module(s) 827, one or more communication module(s) 828, one or more classification module(s) 829, one or more treatment promotion module(s) 830, one or more playback optimization module(s) 831, one or more experimental module(s) 832, and/or one or more dynamic module(s) 833. Some or all of these module(s) may be sub-module(s). Sub or all of these module(s) may be part of the product platform and some or all of these modules may be part of the synthetic platform. Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the server 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, user preference information, user contact data, device pairing information, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the server 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the implementation module(s) 826 may include computer-executable instructions, code, or the like that responsive to execution by one or more of the processor(s) 802 may perform functions including, but not limited to, overseeing coordination and interaction between one or more modules and computer executable instructions in data storage 820 and/or determining user selected actions and tasks. Implementation module 826 may further coordinate with communication module 828 to send messages to and receive messages from computing device 110.

The clustering module(s) 827 may include computer-executable instructions, code, or the like that responsive to execution by one or more of the processor(s) 802 may perform functions including, but not limited to, determining and training a clustering model using various data including events data and/or network performance data. The clustering module 827 may include a cluster training module, a cluster module, a data preprocessor, a feature extractor, a cluster algorithm library, a cluster validation module and/or a cluster model database.

The communication module(s) 828 may include computer-executable instructions, code, or the like that responsive to execution by one or more of the processor(s) 802 may perform functions including, but not limited to, communicating with one or more computing devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The classification module(s) 829 may include computer-executable instructions, code, or the like that responsive to execution by one or more of the processor(s) 802 may perform functions including, but not limited to, determining and training a classification model using various data including events data and/or network performance data. The classification module 829 may include a probability table, a performance history table, a profiler module, a classification algorithm library, a classification model library, a classification validation module, a label history, and/or classification metrics.

The treatment promotion module(s) 830 may include computer-executable instructions, code, or the like that responsive to execution by one or more of the processor(s) 802 may perform functions including, but not limited to, determining treatment parameters (e.g., network settings) to improve and/or optimize network performance on a computing device. The treatment promotion module(s) 830 may include a performance metrics module, a metrics database, a treatment score module, a database of policies, and/or a database of archived treatments.

The playback optimization module(s) 831 may include computer-executable instructions, code, or the like that responsive to execution by one or more of the processor(s) 802 may perform functions including, but not limited to, interfacing with the computing device (e.g., via an implementation module) and determining and sending configuration parameters (e.g., treatment parameters) to computing devices for improving the quality of experience (QoE) on the computing device. In one example, the playback optimization module 831 may choose between multiple promoted treatments based on certain policies.

The experimental module(s) 832 may include computer-executable instructions, code, or the like that responsive to execution by one or more of the processor(s) 802 may perform functions including, but not limited to, simulating network performance for a device based on a variety of possible treatments and determining quality of experience (QoE) scores based on the treatments. The experimental module 832 may further include a simulation module, experimental treatment promotion module, a data preprocessor, an events database, a parameter library, a policies database, an experimental treatment analyzer and/or an experimental treatment database.

The dynamic module(s) 833 may include computer-executable instructions, code, or the like that responsive to execution by one or more of the processor(s) 802 may perform functions including, but not limited to, updating the classification of a network during a media content streaming session to determine updated treatment parameters (e.g., network settings) to improve the quality of experience for a computing device during a streaming session. The dynamic model may include a feature extraction module, a classification module, and a label library.

Referring now to other illustrative components depicted as being stored in the data storage 820, the O/S 822 may be loaded from the data storage 820 into the memory 804 and may provide an interface between other application software executing on the server 800 and hardware resources of the server 800. More specifically, the O/S 822 may include a set of computer-executable instructions for managing hardware resources of the server 800 and for providing common services to other application programs (e.g., managing memory allocation among various application programs). In certain example embodiments, the O/S 822 may control execution of the other program module(s) to for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 800, the optional input/output (I/O) interface(s) 806 may facilitate the receipt of input information by the server 800 from one or more I/O devices as well as the output of information from the server 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 800 or may be separate. The I/O devices may further include, for example, any number of peripheral devices such as data storage devices, printing devices, and so forth.

The optional I/O interface(s) 806 may also include an interface for an external peripheral device connection such as universal serial bus (USB), FireWire, Thunderbolt, Ethernet port or other connection protocol that may connect to one or more networks. The optional I/O interface(s) 806 may also include a connection to one or more of the antenna(e) 834 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 800 may further include one or more network interface(s) 808 via which the server 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a Bluetooth antenna configured to transmit or receive signals in accordance with established standards and protocols, such as Bluetooth and/or BLE. Alternatively, or in addition to, antenna(e) 834 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the server 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the server 800. The transceiver(s) 812 may further include a low noise amplifier (LNA), additional signal amplifiers, an analog-to-digital (A/D) converter, one or more buffers, a digital baseband, or the like.

Figure 11:
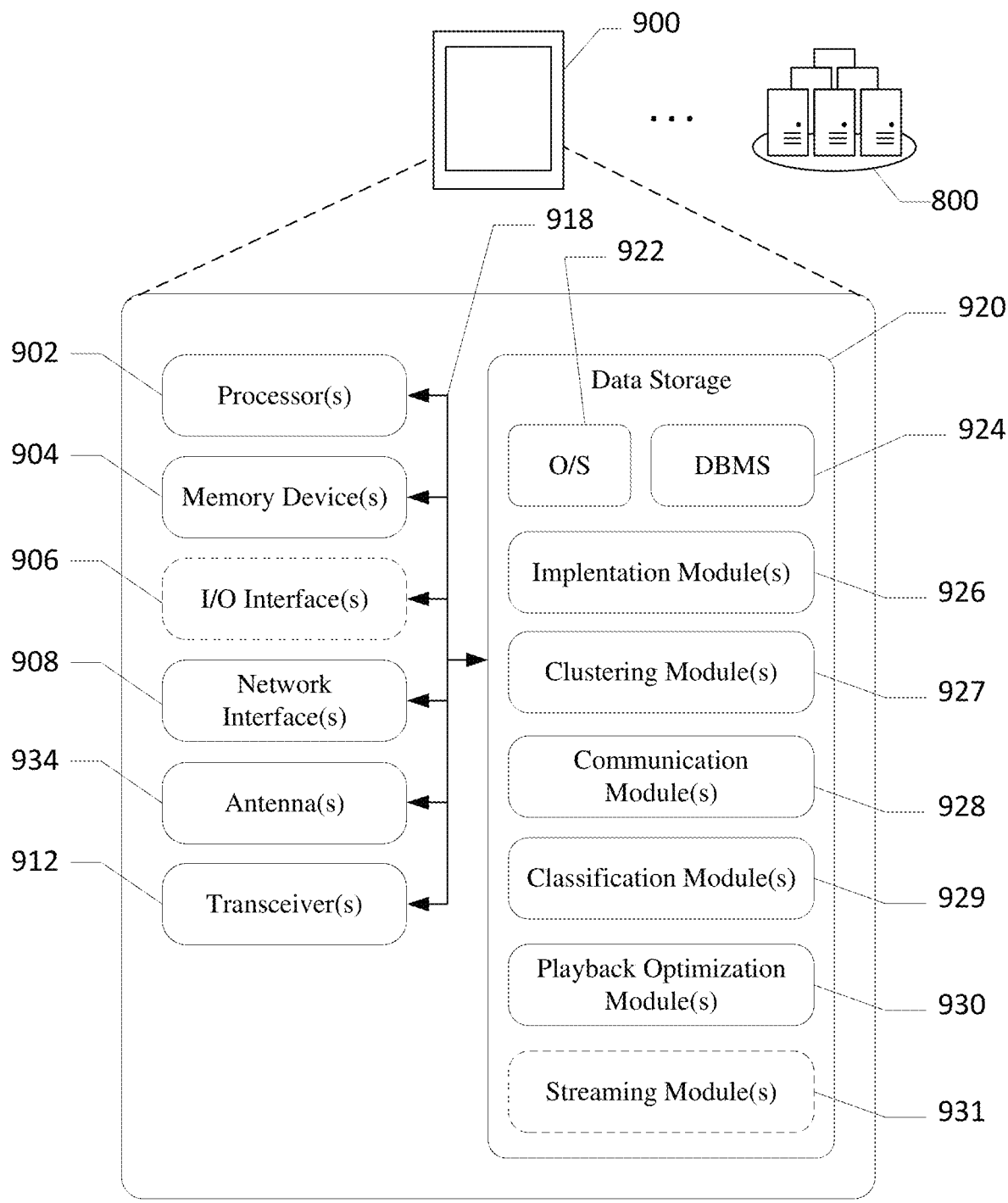
FIG. 11 is a schematic block diagram of a device in accordance with one or more example embodiments of the disclosure.

FIG. 11 is a schematic block diagram of a computing device 900 in accordance with one or more example embodiments of the disclosure. The computing device 900 may be a mobile device, laptop computer, desktop computer, tablet, electronic device, smartphone, e-reader, wearable device, or the like, or otherwise may include any suitable computing device capable of receiving and/or sending data, and may be coupled to other computing devices such as a server, for example. Computing device 900 may correspond to computing device 110 and/or and any other computing device of FIGS. 1-9. Server 800 may be the same as server 800 of FIG. 10.

The computing device 900 may be configured to communicate via one or more networks with one or more servers, search engines, user devices, electronic devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 900 may include one or more processors (processor(s)) 902, one or more memory devices 904 (generically referred to herein as memory 904), one or more optional input/output (I/O) interface(s) 906, one or more network interface(s) 908, one or more transceivers 912, one or more antenna(s) 934, and data storage 920. The computing device 900 may further include one or more buses 918 that functionally couple various components of the computing device 900. These various components will be described in more detail hereinafter.

The computing device 900 may further include one or more antenna(e) 934 that may have the same or substantially the same features, operation, and/or functionality as described above with respect to antenna(e) 834. The bus(es) 918 may have the same or substantially the same features, operation, and/or functionality as described above with respect to bus(es) 918. The memory 904 may have the same or substantially the same features, operation, and/or functionality as described above with respect to memory 804.

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more optional database management systems (DBMS) 924; and one or more program module(s), applications, engines, computer-executable code, scripts, or the like such as, for example, one or more implementation module(s) 926, one or more clustering module(s) 927, one or more communication module(s) 928, one or more classification module(s) 929, and/or one or more playback optimization module(s) 931. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the computing device 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute computer-executable instructions loaded therein. For example, the processor(s) 902 may be configured to execute computer-executable instructions of the various program module(s), applications, engines, or the like of the computing device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 11, the implementation module(s) 926 may include computer-executable instructions, code, or the like that responsive to execution by one or more of the processor(s) 902 may perform functions including, but not limited to, overseeing coordination and interaction between one or more modules and computer executable instructions in data storage 920 and/or determining user selected actions and tasks. Implementation module 926 may further coordinate with communication module 928 to send messages to and receive messages from a server (e.g., server 800 of FIG. 10).

The clustering module(s) 927 may include computer-executable instructions, code, or the like that responsive to execution by one or more of the processor(s) 902 may perform functions including, but not limited to, determining and executing a clustering model. The clustering module 927 may include a cluster training module, a cluster module, a data preprocessor, a feature extractor, a cluster algorithm library, a cluster validation module and/or a cluster model database.

The communication module(s) 928 may include computer-executable instructions, code, or the like that responsive to execution by one or more of the processor(s) 902 may perform functions including, but not limited to, communicating with one or more computing devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The classification module(s) 929 may include computer-executable instructions, code, or the like that responsive to execution by one or more of the processor(s) 902 may perform functions including, but not limited to, determining and executing a classification model. The classification module 929 may include a probability table, a performance history table, a profiler module, a classification algorithm library, a classification model library, a classification validation module, a label history, and/or classification metrics.

The playback optimization module(s) 931 may include computer-executable instructions, code, or the like that responsive to execution by one or more of the processor(s) 902 may perform functions including, but not limited to, interfacing with the server (e.g., via an implementation module) and determining treatments (e.g., promoted treatments) for improving the quality of experience (QoE) on the computing device. In one example, the playback optimization module 931 may choose between multiple promoted treatments based on certain policies and/or labels.

Referring now to other illustrative components depicted as being stored in the data storage 920, the O/S 922 may be loaded from the data storage 920 into the memory 904 and may provide an interface between other application software executing on the computing device 900 and hardware resources of the computing device 900. More specifically, the O/S 922 may include a set of computer-executable instructions for managing hardware resources of the computing device 900 and for providing common services to other application programs (e.g., managing memory allocation among various application programs). In certain example embodiments, the O/S 922 may control execution of the other program module(s) to for content rendering. The O/S 922 may include any operating system now known or which may be developed in the future including, but not limited to, any server operating system, any mainframe operating system, or any other proprietary or non-proprietary operating system.

The optional DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 900, the optional input/output (I/O) interface(s) 906 may have the same or substantially the same features, operation, and/or functionality as described above with respect to input/output (I/O) interface(s) 906. The computing device 900 may further include one or more network interface(s) 908 via which the computing device 900 may communicate with any of a variety of other systems, platforms, networks, devices, and so forth. The network interface(s) 908 may enable communication, for example, with one or more servers, computing devices, one or more wireless routers, one or more host servers, one or more web servers, and the like via one or more of networks. The transceiver(s) 912 may have the same or substantially the same features, operation, and/or functionality as described above with respect to transceiver(s) 812.

It should be appreciated that the program module(s), applications, computer-executable instructions, code, or the like depicted in FIG. 10 as being stored in the data storage 820, or depicted in FIG. 11 as being stored in the data storage 920, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 800, computing device 800 and/or hosted on other computing device(s) accessible via one or more networks, may be provided to support functionality provided by the program module(s), applications, or computer-executable code depicted in FIG. 10, FIG. 11 and/or additional or alternate functionality. Further, functionality may be modularized differently such that processing described as being supported collectively by the collection of program module(s) depicted in FIG. 10 and/or or FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 and/or FIG. 11 may be implemented, at least partially, in hardware and/or firmware across any number of devices.

It should further be appreciated that the server 800 and/or computing device 900 may include alternate and/or additional hardware, software, or firmware components beyond those described or depicted without departing from the scope of the disclosure. More particularly, it should be appreciated that software, firmware, or hardware components depicted as forming part of the server 800 and/or computing device 900 are merely illustrative and that some components may not be present or additional components may be provided in various embodiments. While various illustrative program module(s) have been depicted and described as software module(s) stored in data storage 920 and/or data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining a first device is associated with a first network class based on a classification algorithm;
   sending a first treatment parameter associated with the first network class to the first device;
   determining network performance data from a plurality of devices;
   updating a clustering algorithm using the network performance data to determine an updated clustering algorithm, the clustering algorithm trained to determine network classes, each network class based on associated network characteristics of one or more networks;
   updating the classification algorithm based on the updated clustering algorithm to determine an updated classification algorithm;
   determining first network performance data from the first device, the first network performance data corresponding to network performance on the first device, the first network performance data including one or more of throughput data or latency data;
   determining the first device is associated with a second network class using the updated classification algorithm and based on the first network performance data, the second network class having network characteristics different than the first network class;
   determining a request for a new treatment parameter from the first device;
   determining to send a second treatment parameter to the first device based on the first device being associated with the second network class, the new treatment parameter associated with the second network class; and
   sending the second treatment parameter to the first device to cause the first device to apply the second treatment parameter on the first device to improve network performance on the first device.

2. The method of claim 1, further comprising:
   determining, after updating the classification algorithm, second network performance data from a second plurality of devices;
   updating the updated clustering algorithm using the second network performance data to determine a second updated clustering algorithm; and
   updating the updated classification algorithm based on the second updated clustering algorithm to determine a second updated classification algorithm.

3. The method of claim 1, further comprising:
   determining a first quality value corresponding to the first treatment parameter;
   determining a second quality value corresponding to the second treatment parameter; and
   determining the second quality value exceeds the first quality value.

4. The method of claim 1, wherein the first treatment parameter causes the first device to adjust one or more of buffer occupancy, buffer rate, or buffer size.

5. A method comprising:
   sending a first parameter to a first device to improve network performance on the first device using the first parameter, the first parameter corresponding to a first network class;
   determining network performance data including one or more of first throughput data and first latency data of a second network on a second device;
   updating a clustering algorithm using the network performance data resulting in an updated clustering algorithm, the clustering algorithm trained to determine network classes, each network class based on associated network characteristics of one or more networks;
   updating a classification algorithm based on the updated clustering algorithm resulting in an updated classification algorithm;
   determining second network performance data including one or more of second throughput data and second latency data of a first network on the first device;
   determining the first device is associated with a second network class using the updated classification algorithm and based on the second network performance data;
   determining a second parameter is associated with the second network class; and
   sending the second parameter to the first device to improve network performance on the first device.

6. The method of claim 5, further comprising:
   determining a first quality value corresponding to the first parameter;
   determining a second quality value corresponding to the second parameter; and
   determining the second quality value exceeds the first quality value; and
   sending the second parameter to the first device to adjust network settings on the first device using the second parameter.

7. The method of claim 5, further comprising:
   determining a set period of time has elapsed;
   determining, after updating the classification algorithm, third data indicative of a third network on a third device;
   updating the updated clustering algorithm using the third data resulting in a second updated clustering algorithm; and
   updating the updated classification algorithm based on the second updated clustering algorithm to determine a second updated classification algorithm.

8. The method of claim 5, wherein the first parameter causes the first device to adjust one or more of buffer occupancy, buffer rate, or buffer size.

9. The method of claim 5, further comprising instructing the first device to apply the first parameter for a first period of time.

10. A system comprising:
   memory configured to store computer-executable instructions, and
   at least one computer processor configured to access memory and execute the computer-executable instructions to:
      send a first parameter to a first device to improve network performance on the first device using the first parameter, the first parameter corresponding to a first network class;
      determine network performance data including one or more of first throughput data and first latency data of a second network on a second device;
      update a clustering algorithm using the network performance data resulting in an updated clustering algorithm, the clustering algorithm trained to determine network classes, each network class based on associated network characteristics of one or more networks;
      update a classification algorithm based on the updated clustering algorithm resulting in an updated classification algorithm;
   determine second network performance data including one or more of second throughput data and second latency data of a first network on the first device;
      determine the first device is associated with a second network class using the updated classification algorithm and based on the second network performance data;
      determine a second parameter is associated with the second network class; and
      send the second parameter to the first device to improve network performance on the first device.

11. The system of claim 10, wherein the at least one computer processor is further configured to access memory and execute the computer-executable instructions to:
   determine a first quality value corresponding to the first parameter;
   determine a second quality value corresponding to the second parameter; and
   determine the second quality value exceeds the first quality value; and
   send the second parameter to the first device to adjust network settings on the first device using the second parameter.

12. The system of claim 10, wherein the at least one computer processor is further configured to access memory and execute the computer-executable instructions to:
   determine a set period of time has elapsed;
   determine, after updating the classification algorithm, third data indicative of a third network on a third device;
   update the updated clustering algorithm using the third data resulting in a second updated clustering algorithm; and
   update the updated classification algorithm based on the second updated clustering algorithm to determine a second updated classification algorithm.

13. The system of claim 10, wherein the first parameter causes the first device to adjust one or more of buffer occupancy, buffer rate, or buffer size.

14. The system of claim 10, wherein the at least one computer processor is further configured to access memory and execute the computer-executable instructions to:
   instruct the first device to apply the first parameter for a first period of time.

* * * * *